A. L. RUNYAN.
RESILIENT TIRE.
APPLICATION FILED NOV. 3, 1916.
1,227,495.
Patented May 22, 1917.
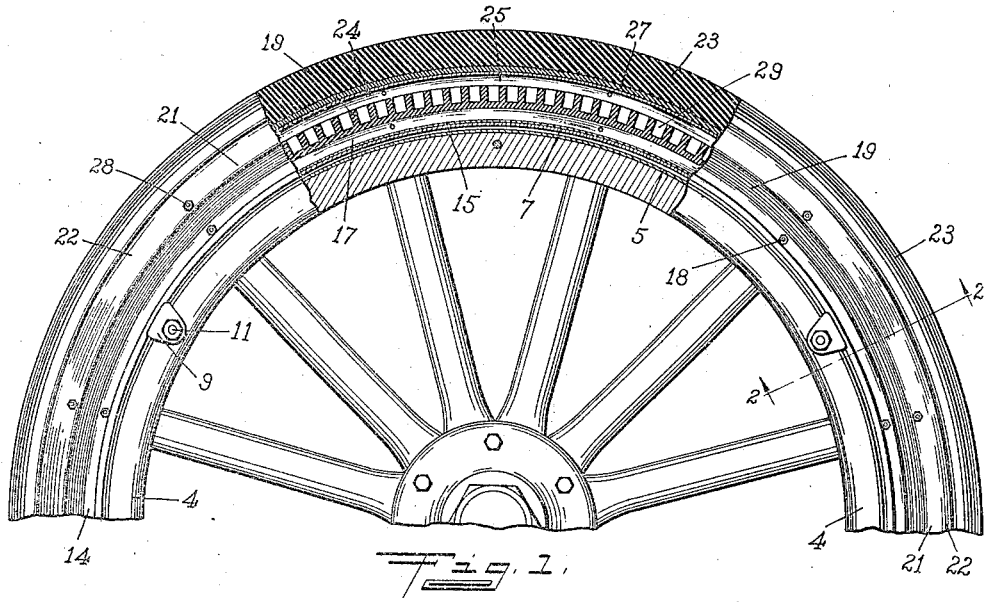
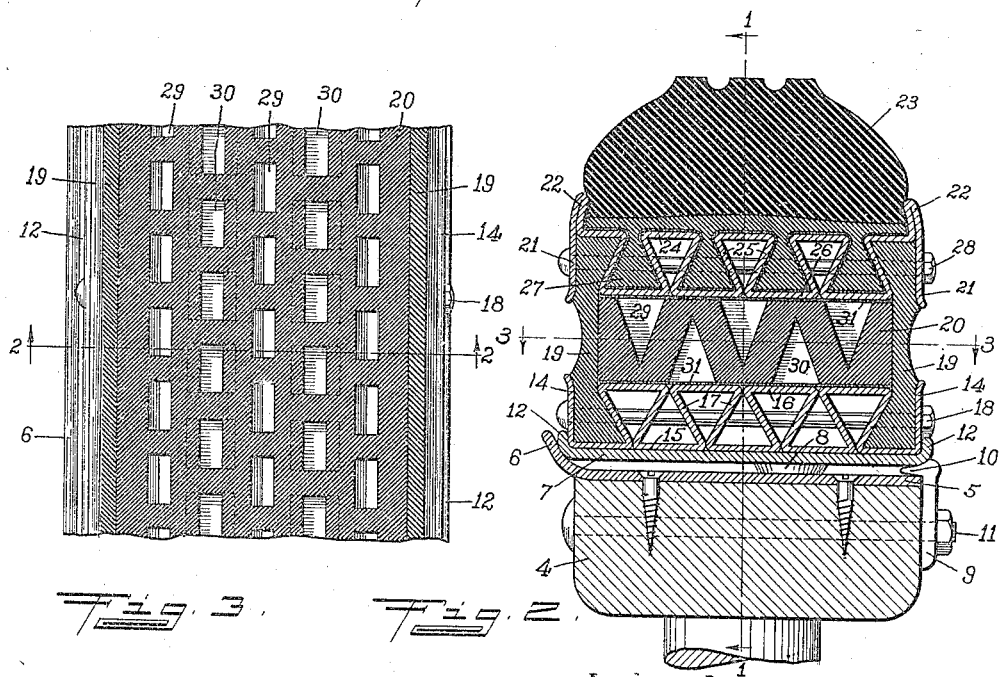
Arthur L. Runyan, Inventor.
Witness:

UNITED STATES PATENT OFFICE.

ARTHUR L. RUNYAN, OF OMAHA, NEBRASKA, ASSIGNOR TO RUNYAN CUSHION WHEEL COMPANY, OF OMAHA, NEBRASKA, A CORPORATION.

RESILIENT TIRE.

1,227,495.  Specification of Letters Patent.  Patented May 22, 1917.

Application filed November 3, 1916. Serial No. 129,287.

*To all whom it may concern:*

Be it known that I, ARTHUR L. RUNYAN, a citizen of the United States, and a resident of Omaha, in the county of Douglas and State of Nebraska, have invented certain new and useful Improvements in Resilient Tires, of which the following is a specification.

My invention relates to resilient tires for motor-vehicle wheels, particularly for wheels of this class adapted to receive demountable tire-rims. It is the object of my invention to provide a resilient tire having substantially the same shock-absorbing capacity as pneumatic tire, but so constructed as to be more durable than a pneumatic tire. A further object of my invention is to provide in a unitary tire-structure a solid tread of resilient material disposed around a rigid annular metal rim or band which in turn incloses a resilient cushion-ring having pockets or air-spaces in which air is confined without being normally under compression, and the whole mounted on a rigid rim so as to be interchangeable with pneumatic tires carried on standard demountable rims. A further object of my invention is to provide a strong and rigid metal rim having means for inter-engagement with a solid tread of resilient material, and having a minimum weight proportional to its resistance to deformation. A further object of my invention is to provide simple and efficient means for holding the inner and outer edges of side-rings of resilient material used for confining and inclosing the sides or lateral edges of a resilient cushion-ring disposed between concentric metal bands or rings. Further objects of my invention will appear and be fully explained hereinafter.

In the accompanying drawings Figure 1 is a partial side view of a wheel provided with a tire embodying my invention, and partly a vertical sectional view thereof on the plane of the line 1—1 of Fig. 2, Fig. 2 is a transverse sectional view on the plane of the lines 2—2 of Figs. 1 and 3, and Fig. 3 is a circumferential section on the line 3—3 of Fig. 2.

In the illustrated embodiment of my invention the wheel-felly 4 has a metal band 5 suitably secured thereon, said felly-band having at one side an inclined flange 6 adapted for engagement with a demountable tire-rim 7. Said rim 7 has lugs 8 on the inner side thereof engaging the adjacent portions of the band 5, and the rim is held removably on said felly-band by means of washers 9 having at one side wedge-shaped projections 10 which enter the space between the rim and band as shown in Fig. 2, the washers being held by nuts screwed on the ends of bolts 11 which extend transversely through the felly 4. The foregoing elements of the structure shown are the same as are employed for a standard demountable pneumatic tire, except that the rim 7 merely has short straight flanges 12 at the edges thereof instead of flanges formed for engagement with the base-portion or beads of a pneumatic tire.

Upon the rim 7, fitting between the side-flanges 12 thereof, there is disposed the inner or base-portion of my tire, said base-portion comprising a ring formed from a relatively thin annular metal plate of which the edges constitute vertically extending flanges 14, while the intermediate portions are bent so as to inclose and form the sides of annular cells which are triangular in cross-section. The apices of said triangular cell-spaces are directed alternately inwardly and outwardly, and the base-portions thereof are alined horizontally, so that the metal portions 15 and 16 form substantially continuous plates at the inner and outer sides of the ring, said portions 15 and 16 being connected by integral angularly-extending portions 17 which separate the adjoining triangular cell-spaces. At positions suitably spaced circumferentially of the ring, cross-bolts 18 extend laterally through openings therefor in the flanges 14 and the diagonal or angular portions 17. The spaces adjoining the flanges 14 are employed for receiving the inner edges of side-rings 19, which are formed of rubber or like resilient material, and inclose the lateral edges of the resilient cushion-ring 20. The outer edges of the side-rings 19 are held in recesses in the lateral edge-portions of the tread-rim, as will be hereinafter explained. The structure of the tread-rim is similar to that of the base-ring, and said rim comprises a relatively thin annular metal plate, having side-flanges 21, and the intermediate portions thereof being bent alternately inwardly and outwardly to inclose annular spaces of approximately triangular cross-section. The flanges 21 at their outer edges are doubled back to form side retaining-flanges 22 for the resilient tread 23. Between the bases of the retaining-flanges 22, portions 24 of the metal plate extend horizontally, and the edges thereof are connected by integral diagonally-extending portions 25 with inner horizontal portions 26. The edges of the inner horizontal portions 26 are in contact with each other so as to form a continuous outer bearing for the cushion-ring 20, but the outer horizontal portions 24 are spaced apart at their adjacent edges so as to form between them the neck-portions of dove-tail spaces of which the sides and bottom are formed or inclosed by the portions 25 and 26. Said dove-tail spaces are filled with a rubber composition which is continuous and integral with the tread 23, but which may be harder and firmer than the tread so as to form a strong attaching-base therefor. The outer edges of the side rings 19 are held in the recesses formed between the side flanges 21 and the corresponding diagonally extending portions 25 of the tread rim, as shown particularly in Fig. 2. Cross-bolts 28 extend laterally through openings therefor in the side-flanges 21 and the diagonal portions 25, said cross-bolts being spaced circumferentially similarly to the cross-bolts 18 of the base-ring.

The cushion-ring 20 is an annular body of resilient rubber or rubber composition, having in both its inner and outer sides series of spaces or air-pockets which are preferably wedge-shaped and arranged so that the edges at the apices thereof extend circumferentially. The outer pockets 29 are in staggered or alternating relation, both laterally and circumferentially, to the inner pockets or spaces 30, and the pointed ends or apices of the inner and outer series of pockets overlap, as shown. Preferably, the inner and outer surfaces of the cushion-ring are covered by layers 31 of rubber-impregnated fabric which are cemented or vulcanized to the body of the ring so as to close and seal the ends of the air-pockets 29 and 30 and prevent the escape of air therefrom when the cushion is deformed by pressure thereon.

It will be seen from the foregoing that, when the tire is in use, the tread 23 serves one of the usual purposes of a pneumatic tire, in that it is sufficiently resilient to be indentable by small obstructions, so that in passing over the same it is not necessary for the entire wheel to be raised. While serving the foregoing purpose, the tread may nevertheless be made of firm and durable material so that it will wear longer than the treads of pneumatic tires, and also will not be subject to punctures and blow-outs. The other most important function of a pneumatic tire is performed by the resilient cushion-ring 20, the same absorbing and preventing the transmission to the vehicle of the many shocks and jars incident to the movement of the wheel over rough surfaces. By the peculiar construction of the tread-rim the same affords a firm attachment for the base of the resilient tread, and is of maximum rigidity proportional to its weight, so that it is substantially non-deformable under the stresses to which it is subjected. The compressibility of the cushion-ring, due to the resilient nature of the material of which it is composed, is greatly increased by the provision of the air-pockets or spaces therein, the same providing space into which the resilient material may be displaced when under pressure, and, as the material is deformed and flows into the pockets, the air confined therein by the fabric sealing-sheets 31 is compressed from the inner or smaller ends of the pockets so that the resistance of the cushion to the pressure is gradually and uniformly increased. By increasing or decreasing the relative size and number of the air-pockets in the cushion-ring, the yieldability of the cushion may be proportioned to the weight and load capacity of the vehicle with which the tire is to be used. The use of the cushion-ring in combination with the solid rubber tread relieves the latter of a part of the blows and concussions to which it would be fully subjected if it were placed directly upon the wheel, and thus prolongs the life of the tread. The resilient side-rings 19, having their inner and outer edges securely fastened to the inner and outer metal rings between which the cushion-ring is confined, prevent the entrance of foreign material between said rings when the cushion is so distorted that otherwise dirt and the like might enter the space normally occupied by the cushion. The cellular base-ring, besides affording means for attaching the inner edges of the side-rings 19, serves as a rigid and non-deformable metal body on which to mount the cushion-ring prior to placing the same upon the rim 7, and also serves as a filler of minimum weight, to make the depth or radial thickness of the tire as a whole substantially the same as that of a pneumatic tire of like diameter and capacity. Thus, said base-ring, in connection with the rim 7, enables the tire as a whole to be interchanged with pneumatic tires of corresponding size carried on standard demountable rims. The cross-bolts 18 and 28, extending respectively through the base-ring and tread-rim, serve to hold the edges of the side-rings 19 securely in the recesses therefor in said ring and rim, and prevent lateral spreading of the flanges 14 and 21 as well as of the intermediate portions which form the sides of the annular cells in said rings.

Now, having described my invention, what I claim and desire to secure by Letters Patent is:

1. In a demountable tire for vehicle wheels, a resilient tread, a rigid tread rim on which said tread is mounted, a base ring disposed within and spaced from said tread rim, a resilient cushion ring interposed between said rim and base ring, said cushion ring having outwardly tapering air containing pockets arranged whereby the side walls of each of the pockets under compression are gradually thickened and caused to flow into each pocket to reduce the volume of each of the pockets under compression from the inner ends thereof and thereby gradually compress the air in such pockets according to the loads on the vehicle.

2. In a tire for vehicle wheels, a tread, a tread rim on which said tread is mounted, a base ring disposed within and spaced from said tread rim, a resilient cushion ring interposed between said rim and base ring, said cushion ring having inner and outer series of outwardly tapering air containing pockets therein, all of the pockets being disposed in lines parallel with the vertical plane of the tire and constructed and arranged whereby one series of pockets overlaps the pockets of the other series throughout the greater portion of the length of the latter, and whereby the side walls of each series of pockets under compression are gradually thickened and caused to flow into the pockets to reduce the volume of each of the pockets under compression from the inner ends of the pockets and thereby gradually compress the air in the pockets under compression according to the loads on the vehicle, and a rim disposed within the base ring in fixed relation thereto, said latter rim adapted for demountable engagement with a wheel felly.

3. In a tire for vehicle-wheels, inner and outer members each comprising a relatively thin annular metal plate having vertical side-flanges and intermediate portions formed to inclose annular cells of triangular cross-section whose apices are directed alternately inwardly and outwardly, a resilient cushion-ring disposed between said inner and outer members, and a resilient tread disposed around the outer annular member and having portions entering the alternate annular cells thereof.

4. In a tire for vehicle-wheels, inner and outer annular members each comprising a relatively thin integral annular metal plate formed transversely to provide side-flanges, radially spaced horizontal portions, and diagonal portions connecting said horizontal portions serially and forming the sides of annular spaces of triangular cross-section; a resilient tread disposed around the outer annular member; a resilient cushion-ring disposed between the inner and outer annular members, resilient side-rings disposed at the lateral edges of the cushion-ring, the inner and outer edges of the side-rings fitting within the annular spaces of said annular members adjoining the side-flanges thereof, and transversely extending connecting means between the side-flanges of each annular member.

5. In a demountable tire for vehicle-wheels, a resilient tread, a substantially rigid and non-deformable metal rim carrying said tread, a metal ring disposed within said rim and spaced radially therefrom, a cushion-ring of resilient material disposed between said rim and ring, said cushion-ring having inner and outer series of sealed wedge-shaped air-pockets therein, the apices of said air-pockets directed oppositely to each other, one series of pockets overlapping the pockets of the other series throughout the greater portion of the length of the latter.

ARTHUR L. RUNYAN.

Copies of this patent may be obtained for five cents each, by addressing the "Commissioner of Patents, Washington, D. C."